United States Patent
Jungwirth et al.

(10) Patent No.: US 10,379,324 B2
(45) Date of Patent: Aug. 13, 2019

(54) ADAPTIVE OPTICAL ZOOM SYSTEMS AND METHODS

(71) Applicant: Honeywell International Inc., Morristown, NJ (US)

(72) Inventors: Matthew E. L. Jungwirth, Golden Valley, MN (US); Saad J. Bedros, West St. Paul, MN (US); Alan Cornett, Andover, MN (US); Robert C. Becker, Golden Valley, MN (US)

(73) Assignee: Honeywell International Inc., Morris Plains, NJ (US)

( * ) Notice: Subject to any disclaimer, the term of this patent is extended or adjusted under 35 U.S.C. 154(b) by 107 days.

(21) Appl. No.: 13/958,302

(22) Filed: Aug. 2, 2013

(65) Prior Publication Data

US 2015/0036224 A1    Feb. 5, 2015

(51) Int. Cl.
   *G02B 15/04*    (2006.01)
(52) U.S. Cl.
   CPC .................... *G02B 15/04* (2013.01)
(58) Field of Classification Search
   CPC ........ G02B 3/14; G02B 26/005; G02B 7/102; G02B 13/009; G02B 13/0075; G02B 15/00
   USPC ................. 359/665–667, 676–706
   See application file for complete search history.

(56) References Cited

U.S. PATENT DOCUMENTS

| | | | |
|---|---|---|---|
| 6,977,777 B1 | 12/2005 | Wick | |
| 2006/0047039 A1* | 3/2006 | Kato | G02B 3/14 524/342 |
| 2006/0067663 A1* | 3/2006 | Kita | 396/72 |
| 2009/0185281 A1* | 7/2009 | Hendriks | G02B 3/14 359/666 |
| 2012/0257085 A1* | 10/2012 | Matsumoto et al. | 348/239 |

* cited by examiner

*Primary Examiner* — Evan P Dzierzynski
*Assistant Examiner* — Mitchell T Oestreich
(74) *Attorney, Agent, or Firm* — Brooks, Cameron & Huebsch, PLLC (57) ABSTRACT

Adaptive optical zoom systems and methods are described herein. One example of a method for adaptive optical zoom includes receiving an image at a focal plane array through a number of variable focal length elements, determining a quality of the image, and altering an amperage of the number of variable focal length elements to increase the quality of the image.

23 Claims, 4 Drawing Sheets

ADAPTIVE OPTICAL ZOOM SYSTEMS AND METHODS

TECHNICAL FIELD

The present disclosure relates to adaptive optical zoom systems and methods.

BACKGROUND

A zoom lens is an optical imaging system that changes its magnification or focal length while keeping the relative location of the image plane stationary. A mechanical zoom lens can have a number of optical elements (e.g., lenses) and use cams or gears to adjust the spacing between the number of elements to vary the optical magnification. Adjusting the spacing between the number of elements can require submillimeter precision that has the potential of malfunctioning.

DETAILED DESCRIPTION

An adaptive optical zoom system can include a number of variable focal length elements (e.g., polymer lens, electrically tunable lens, Optotune EL-6-18, etc.) aligned to receive an image, a focal plane array (e.g., staring array, staring-plane array, charge-coupled device (CCD), etc.) aligned to receive the image, and a computing device coupled to the number of variable focal length elements.

The adaptive optical zoom system can combine an optical zoom system coupled to an image recognition system (e.g., computing device utilizing a number of modules, microcontroller, etc.). The optical zoom system can include a number of variable focal length elements (e.g., plurality, two or more, etc.) that are aligned to focus an image on a focal plane array. A distance of an object from the focal plane array can be determined utilizing the image recognition system. The distance can be utilized to determine a focal length of each of the number of variable focal length elements. The focal length of each of the number of variable focal length elements can be altered by applying and/or altering an amperage for each of the number of variable focal length elements.

The amperage provided to each of the number of variable focal length elements can be determined by the image recognition system. For example, the amperage for each of the number of variable focal length elements can be based on the determined distance and/or on a quality of the image received. The amperage for each of the number of variable focal length elements can be altered (e.g., increased, decreased, etc.) until the image received is at an optimal resolution (e.g., optimal image quality, greatest clarity compared to other amperage settings, etc.).

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of variable focal length elements" can refer to one or more variable focal length elements.

Figure 1:
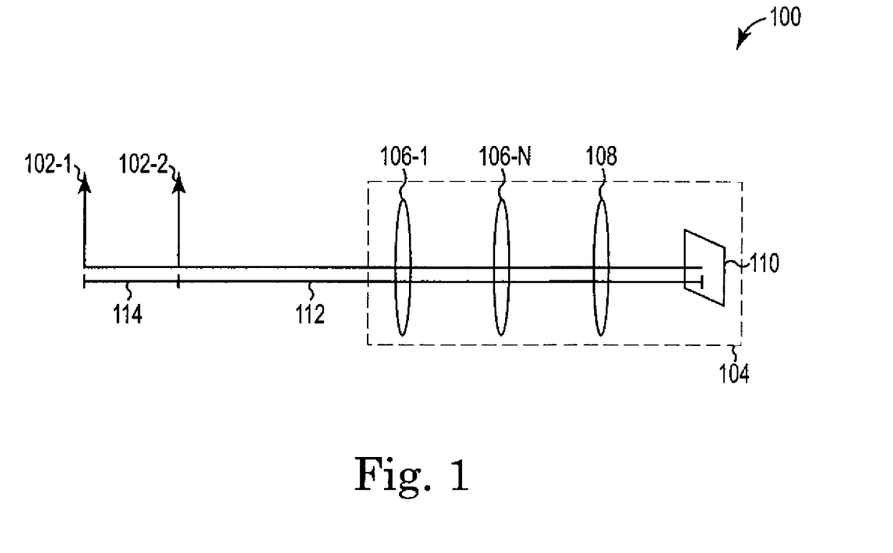
FIG. 1 illustrates an example of an adaptive optical zoom system in accordance with one or more embodiments of the present disclosure.

FIG. 1 illustrates an example of an adaptive optical zoom system 100 in accordance with one or more embodiments of the present disclosure. The optical zoom system 100 can include a number of elements: a device 104, a number of variable focal length elements 106-1, 106-N, a static focal length element 108 (e.g., singlet lens, doublet lens, etc.), and/or a focal plane array 110, among other elements. The optical zoom system 100 can include a greater or fewer number of elements as shown in FIG. 1. For example, there can be a greater number of variable focal length elements 106-1, 106-N (e.g., 3 variable focal length elements, 5 variable focal length elements, N variable focal length elements, etc.). Increasing the number of lenses can increase the zoom capabilities (e.g., distance of objects the optical zoom system 100 can receive, etc.) of the optical zoom system 100.

The device 104 can be a element (e.g., lens case, zoom element, etc.) to encase (e.g., attach, keep in a fixed position, etc.) the number of variable focal length elements 106-1, 106-N, the static focal length element 108, and/or the focal plane array 110. The device 104 can encase the number of variable focal length elements 106-1, 106-N in a fixed position relative to the focal plane array 110. For example, the device 104 can attach to the number of variable focal length elements 106-1, 106-N to prevent movement of the number of variable focal length elements 106-1, 106-N.

A distance between each of the number of variable focal length elements 106-1, 106-N and a distance from each of the number of variable focal length elements 106-1, 106-N and the focal plane array 110 can be determined (e.g., calculated, predetermined) based on a particular application (e.g., distance of objects from the focal plane array 110, desired image qualities, etc.). For example, a distance between a variable focal length element 106-1 and a variable focal length element 106-N can be determined for a desired zoom capability. In addition, a distance between the variable length element 106-1 and the focal plane array 110 can be determined for a desired zoom capability. The determined distances and/or element focal lengths can be used to estimate an aspect ratio (e.g., ratio of width and height of an image) of an image at a particular distance from the focal plane array 110.

The device 104 can encase the static focal length element 108 in a position relative to the focal plane array 110. For example, the device 104 can encase the static focal length element 108 in a fixed position that is at a particular distance from the focal plane array 110 and at a particular distance from the number of variable focal length elements 106-1, 106-N. It can be beneficial to have the static focal length element 108 relatively close to the focal plane array 110. For example, the static focal plane array 108 can be closer to the focal plane array 110 compared to the number of variable focal length elements 106-1, 106-N.

The static focal length element 108 can be attached to one or more of the number of variable focal length elements 106-1, 106-N. The static focal length element 108 attached to a variable focal length element 106-1, 106-N can produce a core element (e.g., lens core, etc.) The core element can be positioned between the number of variable focal length elements 106-1, 106-N and the focal plane array 110. The static focal length element 108 can be attached to a variable focal length element 106-N in a position that is closer to the focal plane array than the variable focal length element 106-N.

The device 104 can be used to zoom, focus, and/or increase an image quality (e.g., image size, number of identifiable pixels, amount of image distortion or artifacts, etc.) of a number of objects 102-1, 102-2. The image quality can be based on a number of image quality factors (e.g., size, sharpness, noise, dynamic range, tone reproduction, contrast, accuracy, distortion, etc.). Increasing the image quality can include altering the number of image quality factors to reduce qualities that are not desired and/or increase qualities that are desired. For example, increasing the qualities that are desired can include increasing the size of the object by zooming in on an object in order to reveal details of the object (e.g., details of a bar code, etc.). In another example, increasing the qualities can include increasing the sharpness of the image and decreasing the noise of the image.

Each of the number of objects 102-1, 102-2 can be at a distance from the focal plane array 110 (e.g., distance 112, distance 114, etc.). An image of one of the number of objects can be received by each of the number of variable focal length elements 106-1, 106-N, received by the static focal length element, and/or received by the focal plane array 110. That is, each of the number of variable focal length elements 106-1, 106-N and the static focal length element 108 can be used to focus an image of the number of objects 102-1, 102-2 on a portion of the focal plane array 110.

A focal length of each of the number of variable focal length elements 106-1, 106-N can be altered to increase an image quality of a particular object (e.g., object 102-1, object 102-2, bar code, etc.). For example, the device 104 can be directed towards object 102-2 and the focal length of the variable focal length element 106-1 and/or the focal length of the variable focal length element 106-N can be altered to increase the image quality of the object 102-2. In this example, the focal length can be altered by increasing or decreasing an amperage provided to the variable focal length element 106-1 and/or the variable focal length element 106-N.

Figure 4:
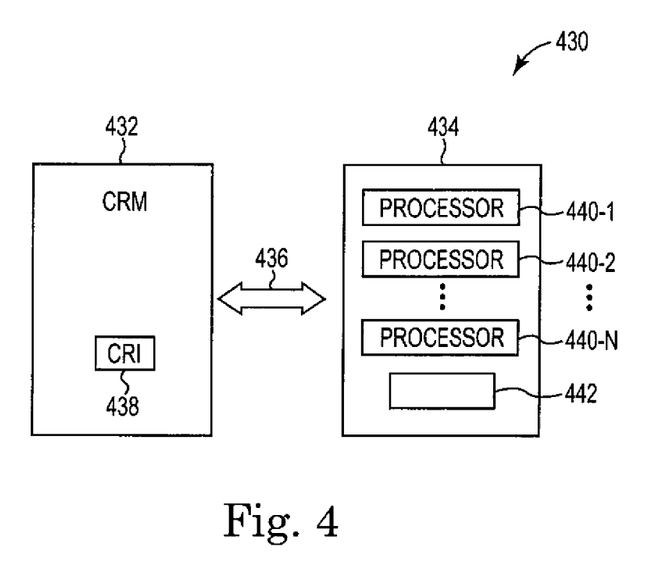
FIG. 4 illustrates a block diagram of an example of a computing device in accordance with one or more embodiments of the present disclosure.

The amperage can be increased and/or decreased by a computing device (e.g., computing device 430 as referenced in FIG. 4, amperage provider, etc.). The computing device can include a microcontroller that can provide specific amperage to each of the number of variable focal length elements 106-1, 106-N. Providing the amperage to each of the number of variable focal length elements 106-1, 106-N can alter the focal length of each of the number of variable focal length elements 106-1, 106-N to a desired focal length. The desired focal length can display an optimized image of an object (e.g., object 102-1, object 102-2, etc.) on the focal plane array 110.

The optimized image can include an image with a number of image qualities that are higher than other images displayed using different focal lengths for the variable focal length elements 106-1, 106-N. For example, the variable focal length element 106-1 can have a first focal length with a corresponding image quality of object 102-2. In this example, the variable focal length element 106-1 can be provided with an amperage to alter the focal length to a second focal length with a higher corresponding image quality of object 102-2. In this example, the optimized image can be the image provided when the variable focal length element 106-1 has the second focal length.

The computing device can utilize a number of resolution enhancing techniques (e.g., blind deconvolution of successive images, classical super resolution, example based super resolution, etc.). The computing device can alter the amperage of the number of variable focal length elements 106-1, 106-N based on the image qualities of the received image. For example, an image of object 102-2 can be received at the focal plane array 110 and the image qualities of the received image can be determined by the computing device. Based on the determined image qualities the computing device can alter the focal length of one or more of the variable focal length elements 106-1, 106-N and determine image qualities of the received images for each amperage alteration. The computing device can determine an optimized image based on the image qualities for the received images for each of the amperage alterations.

The computing device can alter the amperage of the number of variable focal length elements 106-1, 106-N based on a distance 112 (e.g., distance between the focal plane array 110 and object 102-2). For example, if an image of object 102-2 is a desired object (e.g., object that a user wants to receive as a focused image, etc.), a distance 112 can be determined and the computing device can alter the amperage of the number of variable focal length elements 106-1, 106-N to focus on object 102-2. In this example, amperage alterations for objects at a particular distance can be determined (e.g., predetermined) and the amperage alterations for each of the number of focal length elements 106-1, 106-N can be made based on the determined distance.

The desired image of an object (e.g., object 102-1, object 102-2, etc.) can be changed to a different image of a different object. The distance of the different image of the different object can be determined and the focal length of the number of variable focal length elements 106-1, 106-N can be altered by altering the amperage of one or more of the number of variable focal length elements 106-1, 106-N. The amperage can be altered based on the distance of the different object. For example, the desired object can change from object 102-2 to object 102-1. In this example, the determined distance can be distance 114 and the amperage of the variable focal length elements can be altered based on distance 114 to focus an image of object 102-1 on the focal plane array 110.

The distance (e.g., distance 114, distance 112, etc.) of object 102-2 can be determined by a number of methods (e.g., predetermined, calculated, device, etc.). The distance can be calculated utilizing a device and/or method connected to the device 104. For example, the distance can be determined utilizing a laser distance meter (e.g., laser distance measurer, etc.). The calculated distance can be input into the computing device in order to determine amperage alterations of the number of variable focal length elements 106-1, 106-N. The distance can also be a known distance and/or a determined (e.g., predetermined distance). The known distance can be input into the computing device in order to determine amperage alterations of the number of variable focal length elements 106-1, 106-N.

The adaptive optical zoom system 100 can be utilized to focus and increase the image quality of objects at a number of different distances. Altering an amperage provided to the number of variable focal length elements 106-1, 106-N to focus an image of an object can be advantageous over previous mechanical zoom systems. For example, by altering the focal length of the variable focal length elements 106-1, 106-2 in a fixed position it eliminates the need of precise mechanics to change the position of the lenses. In particular environments it can be beneficial to have a device that is capable of proving an image with an increased size and/or image qualities without relying on moving parts that if altered by the environment could increase the chance of malfunction. In addition, by utilizing the variable focal length elements 106-1, 106-N in a fixed position the total mass of the adaptive optical zoom system 100 can be relatively low compared to systems utilizing mechanical zoom.

Figure 2:
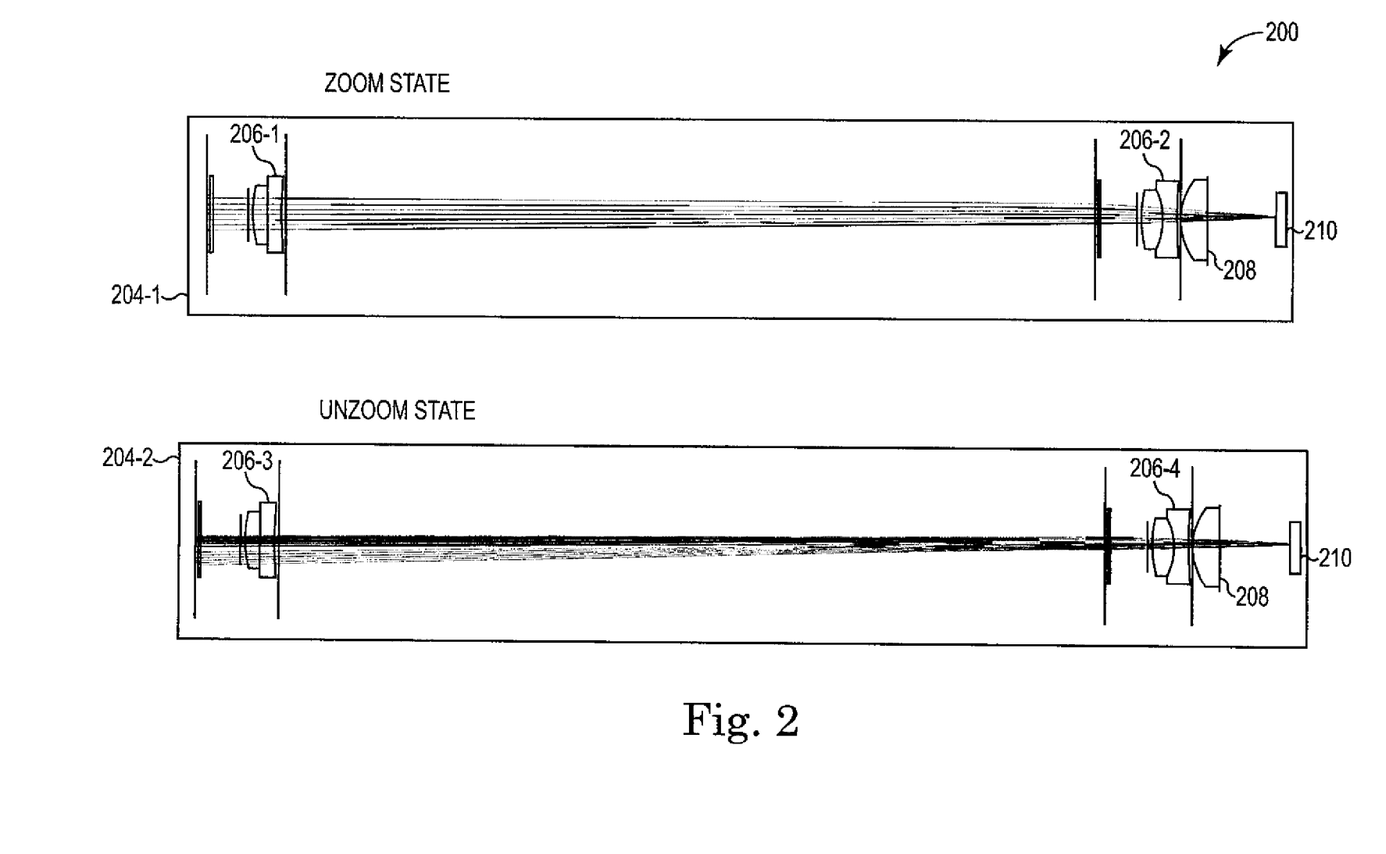
FIG. 2 illustrates an example of an adaptive optical zoom system in accordance with one or more embodiments of the present disclosure.

FIG. 2 illustrates an example of an adaptive optical zoom system 200 in accordance with one or more embodiments of the present disclosure. The adaptive optical zoom system 200 can include a device 204-1 that represents a zoom state and device 204-2 that represents an unzoom state. Device 204-1 can be the same as device 204-2 with a different amperage applied to a number of the variable focal length elements 206-1, 206-2, 206-3, 206-4.

The device 204-1 in a zoom state can include a number of variable focal length elements (e.g., variable focal length element 206-1, variable focal length element 206-2, etc.). As described herein, the number of variable focal length elements 206-1, 206-2 can be polymer lenses (e.g., Optotune EL-6-18, etc.). The device 204-1 can include a variable focal length element 206-2 that is attached to a static focal length element 208. Attaching a variable focal length element 206-2 to a static focal length element 208 can create a core element (e.g., lens core, etc.).

The number of variable focal length elements 206-1, 206-2, the static focal length element 208-1, and a focal plane array 210-1 can be in a fixed position within the device (e.g., device 204-1, device 204-2, etc.). For example, the number of variable focal length elements 206-1, 206-2, the static focal length element 208, and a focal plane array 210-1 can be attached to the interior of the device 204-1. The variable focal length element 206-1 in a zoom state represented by device 204-1 can be in the same location as variable focal length element 206-3 represented in an unzoom state by device 204-2. That is, the focal length of variable focal length element 206-1 can change to the focal length of variable focal length element 206-3 without changing position relative to the focal plane array or relative to the other focal length elements (e.g., variable focal length elements 206-2, 206-4, static focal length element 208, etc.) within the device (e.g., device 204-1, device 204-2).

The number of variable focal length elements 206-1, 206-2 can receive a first amperage from a computing device that produces a first focal length. The first amperage can produce a focal length that represents a zoom state. For example, the device 204-1 can represent a variable focal length element 206-1 with a particular focal length for the variable focal length element 206-1 that results in a zoom state (e.g., providing an image of an object with an increased size over an unzoom state). The amperage provided to the number of variable focal length elements 206-1, 206-2 can be altered to alter the focal length of the number of variable focal length elements 206-1, 206-2. For example, the amperage of the variable focal length element 206-1 can be altered from a first amperage and first corresponding focal length to a second amperage and second corresponding focal length.

The second amperage and second corresponding focal lengths can be represented in device 204-2. The second amperage and second corresponding focal length for the variable focal length element 206-1 and variable focal length element 206-2 can be represented by the variable focal length elements 206-3 and variable focal length element 206-4 respectively. Altering the focal length of the number of variable focal length elements from a zoom state to an unzoom state can alter (e.g., increase, decrease) a size and/or image qualities of an image displayed on the focal plane array (e.g., focal plane array 210-1, focal plane array 210-2, etc.).

Figure 3:
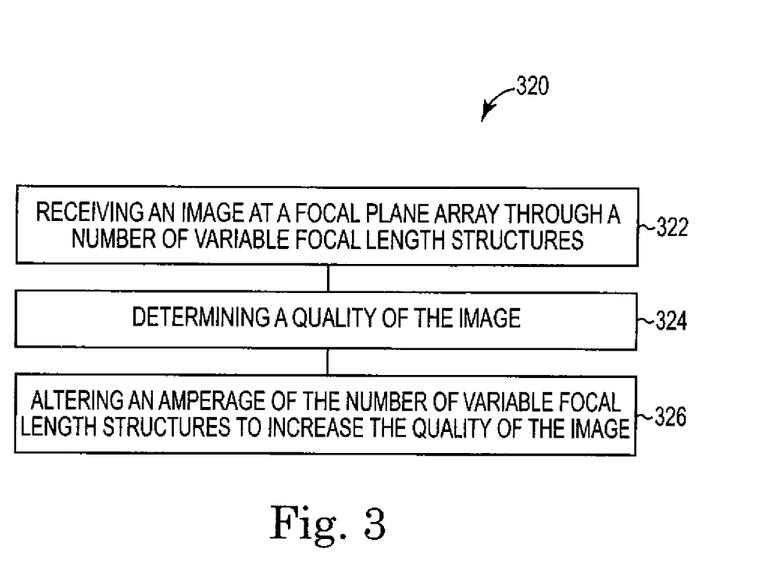
FIG. 3 illustrates an example method for an adaptive optical zoom in accordance with one or more embodiments of the present disclosure.

FIG. 3 illustrates an example method 320 for an adaptive optical zoom in accordance with one or more embodiments of the present disclosure. The method 320 can be utilized to increase a number of image qualities and/or size of an image using an adaptive optical zoom. The method can be performed utilizing a device (e.g., device 104 as referenced in FIG. 1, device 204-1 and device 204-2 as referenced in FIG. 2, etc.).

At 322 the method 320 can include receiving an image at a focal plane array through a number of variable focal length elements. Receiving the image at a focal plane array can include utilizing a device with a number of variable focal length elements in a fixed position. For example, the number of variable focal length elements can be fixed at a position to focus an image of an object on the focal plane array.

Receiving the image at the focal plane can include directing a device at an object to focus an image of the object on the focal plane array. An image of the object can be focused and/or altered by the number of variable focal length elements to be displayed on the focal plane array.

At 324 the method 320 can include determining a quality of the image. Determining the quality of the image that is received at the focal plane array can include evaluating a number of image quality factors (e.g., size, sharpness, noise, dynamic range, tone reproduction, contrast, accuracy, distortion, etc.) of the received image.

The quality of the image can be used to determine an optimal focal length for the number of variable focal length elements. For example, a computing device (e.g., computing device 430 as referenced in FIG. 4, etc.) can utilize the quality of the received image and determine if the number of variable focal length elements should be altered to increase the quality of the received image. The computing device can utilize a plurality of received images to determine an optimal focal length for the number of variable focal length elements. For example, the computing device can determine an image quality for multiple images of an object where each of the variable focal length elements includes a different focal length. In this example, the optimal focal length can be determined by evaluating and comparing the image quality of the multiple images of the object and determining an image with a desired image quality (e.g., largest image, sharpest image, etc.).

At 326 the method 320 can include altering an amperage of the number of variable focal length elements to increase the quality of the image. Altering the amperage of the number of focal length elements can include utilizing a computing device to provide a different amperage to a single and/or multiple variable focal length elements. As described herein, providing a particular amperage to a variable focal length element can provide a particular focal length for the variable focal length element. Altering the focal length of the number of focal length elements can alter the quality of the image. For example, altering the focal length of the variable focal length elements can increase the size of the received image on the focal plane array.

The method 320 can include also determining a distance of an object from the focal plane array. As described herein, determining a distance of an object can include utilizing a number of devices to determine the distance between the object and the focal plane array. The distance of the object from the focal plane array can be used to determine alterations for the focal length of the variable focal length elements. For example, it can be determined that when focusing on an object at a particular distance that the focal length of the variable focal length elements should be altered to a predetermined setting corresponding to the particular distance. In this example, the amperage can be altered for the number of variable focal length elements to alter the focal lengths to the predetermined settings based on the determined distance.

FIG. 4 illustrates a block diagram of an example of a computing device 430 in accordance with one or more embodiments of the present disclosure. The computing device 430 can include a communication interface (e.g., wireless network interface controller, IEEE 802.11 adapters, etc.) for receiving wireless data. The communication interface can be integrated in the computing device 430 and/or be an external card.

The computing device 430, as described herein, can also include a computer readable medium (CRM) 432 in communication with processing resources 440-1, 440-2, . . . , 440-N. CRM 432 can be in communication with a device 434 (e.g., a Java® application server, among others) having processor resources 440-1, 440-2, . . . , 440-N. The device 434 can be in communication with a tangible non-transitory CRM 432 storing a set of computer-readable instructions (CRI) 438 (e.g., modules) executable by one or more of the processor resources 440-1, 440-2, . . . , 440-N, as described herein. The CRI 438 can also be stored in remote memory managed by a server and represent an installation package that can be downloaded, installed, and executed. The device 434 can include memory resources 442, and the processor resources 440-1, 440-2, . . . , 440-N can be coupled to the memory resources 442.

Processor resources 440-1, 440-2, . . . , 440-N can execute CRI 438 that can be stored on an internal or external non-transitory CRM 432. The processor resources 440-1, 440-2, 440-N can execute CRI 438 to perform various functions. For example, the processor resources 440-1, 440-2, . . . , 440-N can execute CRI 438 to perform a number of functions (e.g., determining a quality of an image, altering an amperage of the number of variable focal length elements, determining a distance of an object from the focal plane array, etc.). A non-transitory CRM (e.g., CRM 432), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), as well as other types of computer-readable media.

The non-transitory CRM 432 can also include distributed storage media. For example, the CRM 432 can be distributed among various locations.

The non-transitory CRM 432 can be integral, or communicatively coupled, to a computing device, in a wired and/or a wireless manner. For example, the non-transitory CRM 432 can be an internal memory, a portable memory, a portable disk, or a memory associated with another computing resource (e.g., enabling CRIs to be transferred and/or executed across a network such as the Internet).

The CRM 432 can be in communication with the processor resources 440-1, 440-2, . . . , 440-N via a communication path 436. The communication path 436 can be local or remote to a machine (e.g., a computer) associated with the processor resources 440-1, 440-2, . . . , 440-N. Examples of a local communication path 436 can include an electrical bus internal to a machine (e.g., a computer) where the CRM 432 is one of volatile, non-volatile, fixed, and/or removable storage medium in communication with the processor resources 440-1, 440-2, . . . , 440-N via the electrical bus. Examples of such electrical buses can include Industry Standard Architecture (ISA), Peripheral Component Interconnect (PCI), Advanced Technology Attachment (ATA), Small Computer System Interface (SCSI), Universal Serial Bus (USB), among other types of electrical buses and variants thereof.

The communication path 436 can be such that the CRM 432 is remote from the processor resources e.g., 440-1, 440-2, . . . , 440-N, such as in a network relationship between the CRM 432 and the processor resources (e.g., 440-1, 440-2, . . . , 440-N). That is, the communication path 436 can be a network relationship. Examples of such a network relationship can include a local area network (LAN), wide area network (WAN), personal area network (PAN), and the Internet, among others. In such examples, the CRM 432 can be associated with a first computing device and the processor resources 440-1, 440-2, . . . , 440-N can be associated with a second computing device (e.g., a Java® server).

As described herein, a "module" can include computer readable instructions (e.g., CRI 438) that can be executed by a processor to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system, comprising:
multiple variable focal length elements aligned to receive an image of multiple objects;
a focal plane array, wherein the multiple variable focal length elements and the focal plane array are aligned in a single linear direction;
a computing device coupled to the multiple variable focal length elements to:
  determine a distance between a first object of the multiple objects and the focal plane array and utilize the distance to determine a focal length for a first variable focal length element of the multiple variable focal length elements and the focal plane array;
  determine a distance between a second object of the multiple objects and the focal plane array and utilize the distance to determine a focal length for a second variable focal length element of the multiple variable focal length elements and the focal plane array;
  capture a number of images, altering the focal length of each of the multiple variable focal length elements for each image;
  compare image quality factors of each of the captured images
  determine an optimal focal length for each of the multiple variable focal length elements to increase the image quality factors for the object based on the comparison of image quality factors; and
  set the focal length of each of the multiple variable focal length elements to the optimal focal length for each of the multiple variable focal length elements.

2. The system of claim 1, wherein the multiple variable focal length elements are in a fixed position.

3. A method for adaptive optical zoom, comprising:
receiving an image of multiple objects at a focal plane array through an aperture and multiple variable focal length elements, wherein the focal plane array, the aperture, and the multiple variable focal length elements are aligned in a single linear direction;
determining a distance between a first object and the focal plane array and utilizing the distance to determine a focal length for a first variable focal length element of the multiple variable focal length elements and the focal plane array,
determining a distance between a second object and the focal plane array and utilizing the distance to determine a focal length for a second variable focal length element of the multiple variable focal length elements and the focal plane array; and
determining an optimal focal length for each of the number of variable focal length elements to increase a number of image quality factors for the object based on the comparison of image quality factors.

4. The method of claim 3, wherein altering the amperage includes altering a focal length of at least one of the number of variable focal length elements.

5. The method of claim 3, comprising determining a distance of an object from the focal plane array based on the quality of the image.

6. The method of claim 5, wherein altering the focal length is based on the determined distance of the image from the focal plane array.

7. A system, comprising:
multiple variable focal length elements aligned to focus an image of multiple objects through an aperture on a focal plane array, wherein the focal plane array, the multiple variable focal length elements, and the aperture are aligned in a single linear direction;
a computing device coupled to each of the multiple variable focal length elements and to the focal plane array, wherein the computing device includes instructions to:
  determine a distance between a first object of the multiple objects and the focal plane array and utilize the distance to determine a focal length for a first variable focal length element of the multiple variable focal length elements and the focal plane array;
  determine a distance between a second object of the multiple objects and the focal plane array and utilize the distance to determine a focal length for a second variable focal length element of the multiple variable focal length elements and the focal plane array;
  capture a number of images, altering the focal length of each of the multiple variable focal length elements for each image by altering an amperage applied to each of the multiple variable focal length elements for each image;
  compare image quality factors of each of the captured images;
  determine an optimal focal length and corresponding amperage for each of the multiple variable focal length elements to increase the image quality factors for the first and second objects based on the comparison of image quality factors;
  provide the corresponding amperage to each of the multiple variable focal length elements; and
  alter an amperage of the multiple variable focal length elements based on the determined distance to increase the quality of the image.

8. The system of claim 7, comprising a static focal length element between the multiple variable focal length elements and the focal plane array.

9. The system of claim 7, wherein the computing device is a microcontroller.

10. The system of claim 7, wherein the computing device includes instructions to apply a first amperage to a first variable focal length element of the multiple variable focal length elements and a second amperage to a second variable focal length element of the multiple variable focal length elements.

11. The system of claim 10, wherein the first amperage and the second amperage are different amperages.

12. The system of claim 10, wherein the first amperage and the second amperage are determined based on the determined distance.

13. The system of claim 7, wherein an optimal amperage for each of the multiple variable focal length elements corresponding to the optimal focal length can be determined to increase the image quality factors for the first object and the second object based on the comparison of image quality factors.

14. The system of claim 13, wherein the at least one focal length of the multiple variable focal length elements is altered to the optimal focal length by applying the optimal amperage for each of the at least one of the multiple variable focal length elements.

15. The system of claim 1, wherein the focal plane array is aligned to receive the image through the multiple variable focal length elements.

16. The system of claim 1, wherein each of the number of multiple variable focal length elements includes a different focal length.

17. The method of claim 3, wherein an optimal amperage for each of the multiple variable focal length elements can be determined to increase the image quality factors for a first object and the second object based on the comparison of image quality factors.

18. The method of claim 17, wherein the at least one focal length of the multiple variable focal length elements is altered to the optimal focal length by applying the optimal amperage for each of the at least one of the multiple variable focal length elements.

19. The method of claim 18, wherein applying the optimal amperage includes altering a focal length of at least one of the number of variable focal length elements.

20. The method of claim 17, wherein determining the optimal amperage includes reducing image imperfections by utilizing a resolution enhancing technique.

21. The method of claim 17, wherein determining the optimal the amperage includes comparing an image quality for a number of different amperage settings to increase the quality of the image.

22. The system of claim 7, wherein the multiple of variable focal length elements are electrically tunable polymer lenses and wherein each of the multiple variable focal length elements receive an amperage of energy from the computing device.

23. The system of claim 22, wherein a focal length of each of the multiple variable focal length elements is based on the received amperage of energy.

* * * * *